United States Patent
Cho et al.

(10) Patent No.: US 8,000,397 B2
(45) Date of Patent: Aug. 16, 2011

(54) METHOD AND APPARATUS FOR ACQUIRING OFDM SYNCHRONIZATION

(75) Inventors: Sang-In Cho, DaeJeon (KR); Kyu-Min Kang, DaeJeon (KR); Sang-Sung Choi, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 659 days.

(21) Appl. No.: 12/110,708

(22) Filed: Apr. 28, 2008

(65) Prior Publication Data
US 2009/0154529 A1    Jun. 18, 2009

(30) Foreign Application Priority Data
Dec. 12, 2007 (KR) .................. 10-2007-0128942

(51) Int. Cl.
*H04L 27/28* (2006.01)
(52) U.S. Cl. ..................................... 375/260
(58) Field of Classification Search ........... 375/142, 375/143, 150, 152, 343, 354, 357, 369, 372, 375/373, 374, 137, 260; 370/395.62, 507; 455/265; 702/89; 713/375, 400; 704/216, 704/218, 237, 263; 708/5, 422, 813; 342/108, 342/145, 189, 378
See application file for complete search history.

(56) References Cited

U.S. PATENT DOCUMENTS

| | | | |
|---|---|---|---|
| 7,003,063 B2 | 2/2006 | Mill | |
| 7,613,104 B2 * | 11/2009 | Bhatt et al. | 370/208 |
| 2005/0002369 A1 * | 1/2005 | Ro et al. | 370/342 |
| 2006/0031740 A1 | 2/2006 | Kidambi et al. | |
| 2008/0130722 A1 * | 6/2008 | Choi et al. | 375/150 |
| 2008/0212563 A1 * | 9/2008 | Birru | 370/350 |

FOREIGN PATENT DOCUMENTS

| | | |
|---|---|---|
| KR | 10-2001-0091391 A | 10/2001 |
| KR | 2002-0064575 | 8/2002 |
| KR | 10-0585173 | 5/2006 |
| KR | 10-00770426 B1 | 10/2007 |

OTHER PUBLICATIONS

Seung-Ho Lee et al., "Detection and Symbol Timing Design and Implementation of Signal Synchronization for Wireless Modem", The Korea Information and Communications Society Congress Collected papers as of 2003, 4 pages.
Korean Office Action issued on Apr. 30, 2009 in corresponding Korean Patent Application 10-2007-0128942.

* cited by examiner

*Primary Examiner* — Sam K Ahn
(74) *Attorney, Agent, or Firm* — Staas & Halsey LLP (57) ABSTRACT

Provided is a method and apparatus for acquiring OFDM synchronization even when it fails to detect a plurality of symbols at an initial stage. In the method, a frequency is adjusted to a first frequency band and a cross correlation value between a received preamble symbol and a preset preamble symbol is calculated. When the calculated cross correlation value is larger than a predetermined reference value and is first detected, frequency hopping is performed to receive subsequent symbols and cross correlation values to the subsequent symbols are reexamined. When the reexamined cross correlation value larger than the predetermined reference value is detected, timing synchronization, frequency offset estimation, and frame detection are performed.

11 Claims, 6 Drawing Sheets

METHOD AND APPARATUS FOR ACQUIRING OFDM SYNCHRONIZATION

CROSS-REFERENCE TO RELATED APPLICATIONS

This application claims priority under 35 U.S.C. §119 to Korean Patent Application No. P2007-128942, filed in Korea on Dec. 12, 2007, the disclosure of which is incorporated herein by reference in its entirety.

BACKGROUND OF THE INVENTION

1. Field of the Invention

The present disclosure relates to a method and apparatus for acquiring orthogonal frequency division multiplexing (OFDM) synchronization, and more particularly, to a method and apparatus for acquiring OFDM synchronization by performing timing synchronization and at the same time reexamination of packet detection even when it fails to detect a plurality of symbols at an initial stage.

This work was supported by the IT R&D program of MIC/IITA [Work Management Number: 2006-S-071-02, Work Name: the Development of Super-high Speed Multimedia Transmission Solution]

2. Description of the Related Art

A transmitter of an MB-OFDM UWB system transmits a preamble packet for synchronization before transmitting data, where MB-OFDM UWB stands for multi band orthogonal frequency division multiplexing ultra wide band.

A receiver of an MB-OFDM UWB system performs packet detection, timing synchronization, frequency offset estimation, and frame detection using correlation between a received preamble and a preset preamble.

Figure 1:
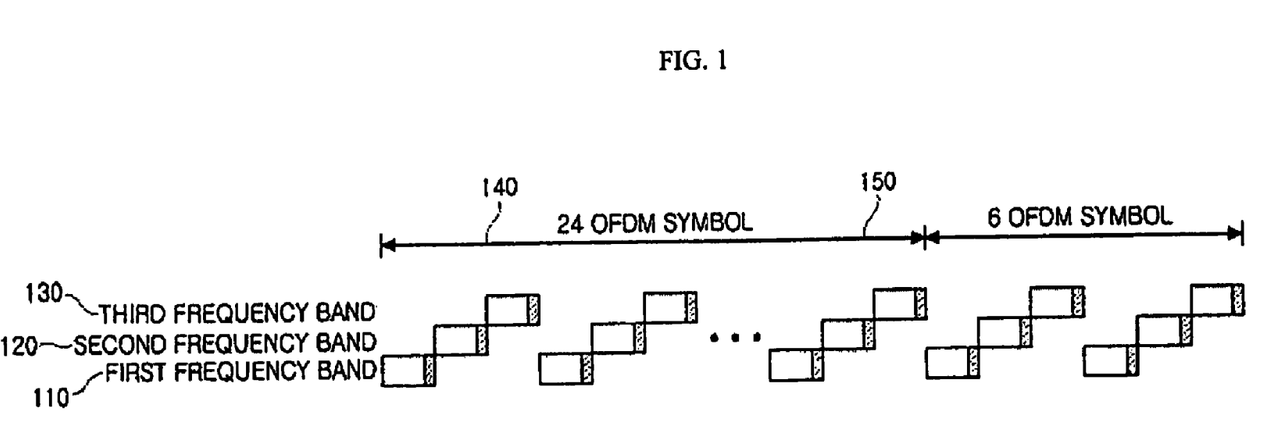
FIG. 1 is a diagram illustrating a structure of an OFDM preamble according to the related art.

FIG. 1 is a diagram illustrating a structure of an OFDM preamble according to the related art.

As shown in FIG. 1, the OFDM preamble includes 24 time domain data 140 for packet detection, timing synchronization, frequency offset estimation, and frame synchronization, and 6 frequency domain data 150 for channel estimation. That is, the OFDM preamble includes total 30 OFDM symbols 140 and 150.

A transmitter alternatively transmits 30 OFDM preambles 140 and 150 using three different frequency bands 110, 120, and 130, each of which has an individual bandwidth of 528 MHz.

A receiver performs packet detection and timing synchronization acquisition through correlation between the received OFDM preambles 140 and 150 and a preset OFDM preamble.

Hereinafter, the three difference frequency bands 110, 120, and 130 are referred as a first frequency band 110, a second frequency band 120, and a third frequency band 130 for convenience, respectively.

Figure 2:
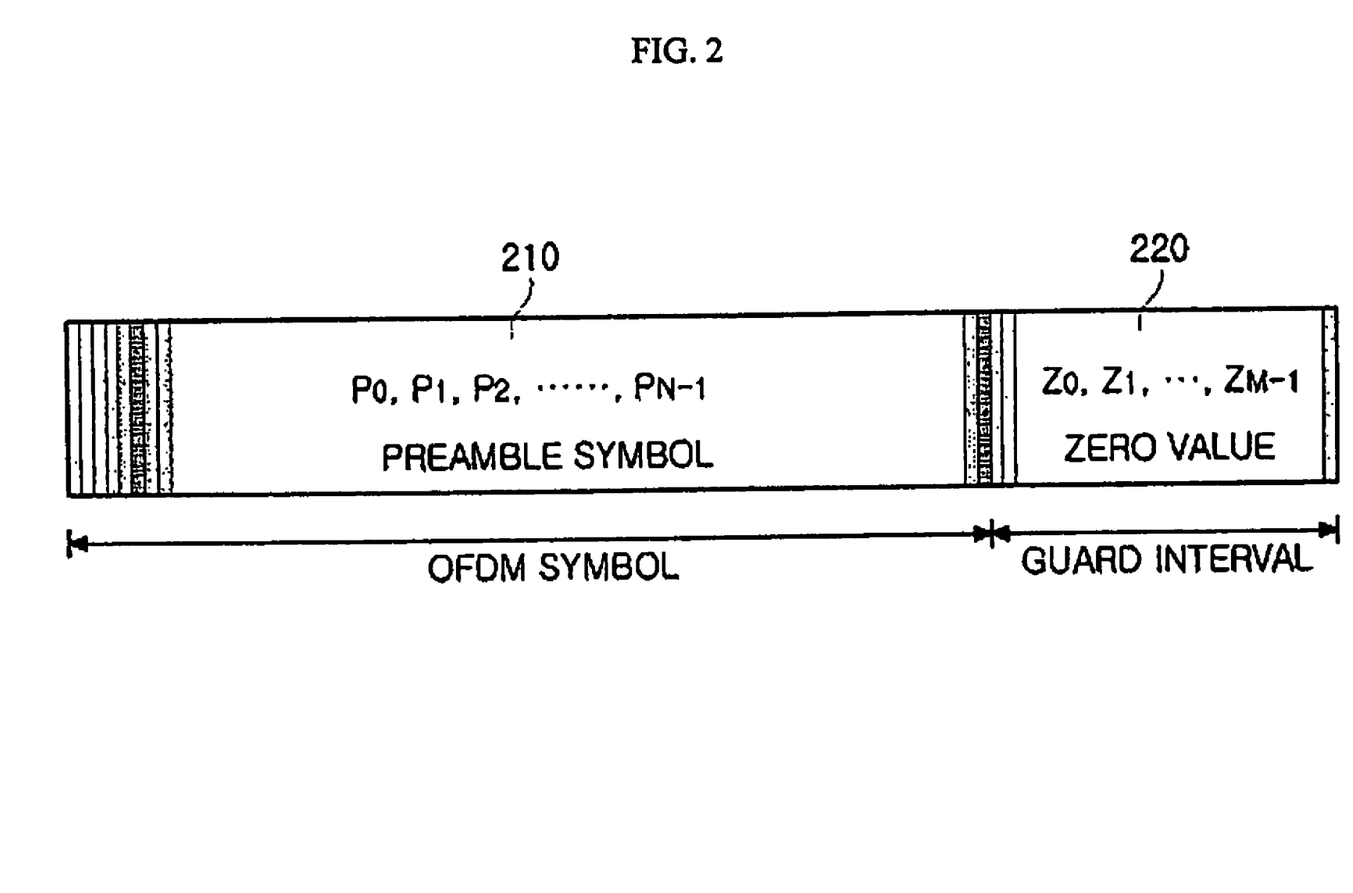
FIG. 2 is a diagram illustrating a structure of an individual OFDM symbol according to the related art.

FIG. 2 is a diagram illustrating a structure of an individual OFDM symbol according to the related art. That is, each of 24 OFDM symbols has a structure shown in FIG. 2.

As shown in FIG. 2, the individual OFDM symbol includes an N-point OFDM symbol 210 formed of preamble pattern data for synchronization acquisition, and an M-point zero value 220 used for a guard interval.

The N-point OFDM symbol 210 is a preamble pattern, which is set according to related standard and known to a transmitter and a receiver.

Therefore, the receiver can perform packet detection by calculating a cross correlation value between a received preamble and a preset preamble.

The M-point zero value 220 is a guard interval between valid data. That is, the M-point zero value 220 is invalid data for protecting valid data.

Figure 3:
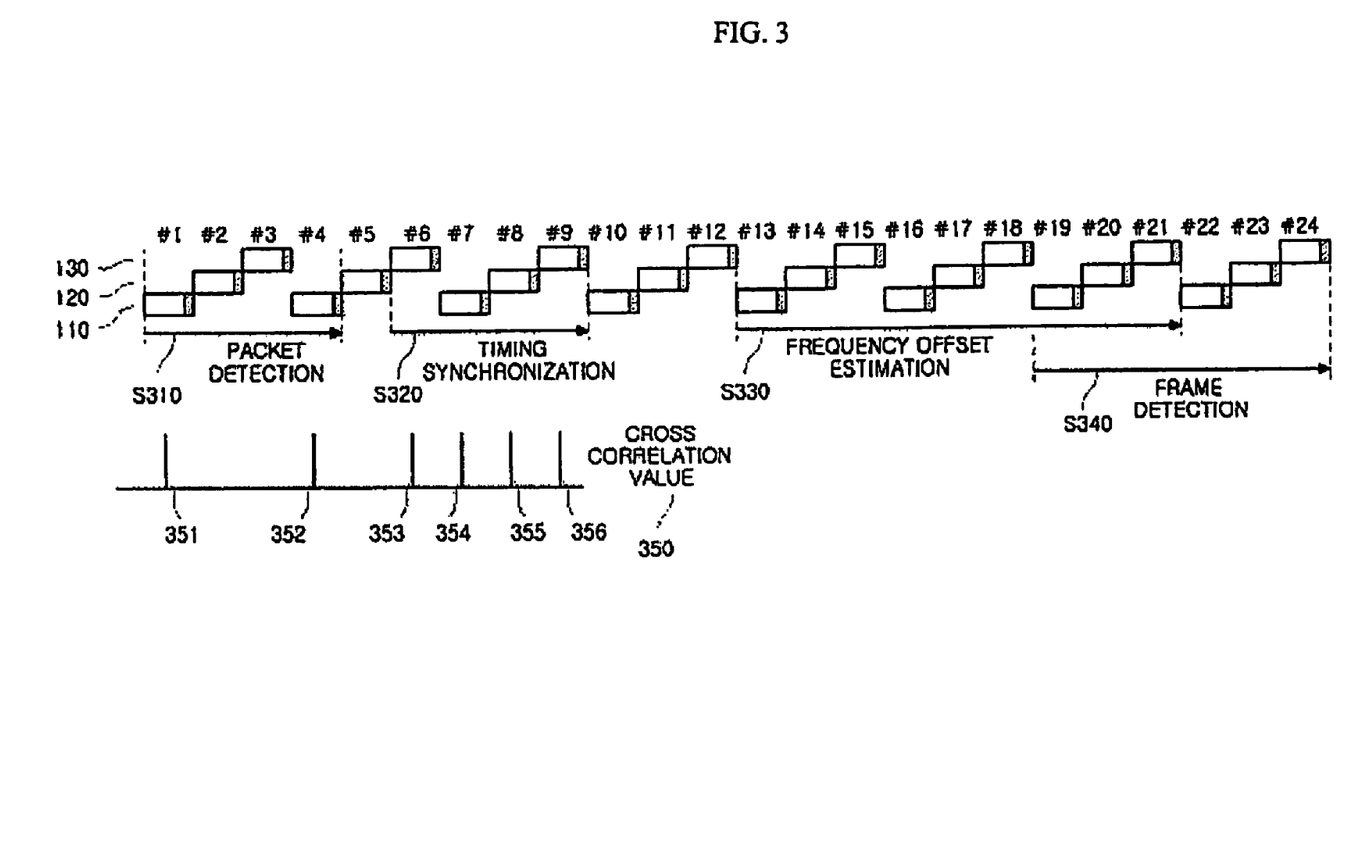
FIG. 3 is a diagram illustrating detection of OFDM symbols and cross correlation value according to the related art.

FIG. 3 is a diagram illustrating detection of OFDM preamble and cross correlation value according to the related art. With reference to FIG. 3, operations of a receiver will be described. That is, the receiver performs packet detection, timing synchronization, frequency offset estimation, and frame detection of a receiver by calculating a cross correlation value between a preset preamble and a preamble received through three different frequencies, which described above.

At step S310, the receiver detects packets by adjusting a frequency to a first frequency band (band #1) 110 and receiving a preamble symbol of the first frequency band 110.

In detail, the receiver receives a first preamble symbol and a fourth preamble symbol, which are transmitted through the first frequency band 110, and determines that a cross correlation value 350 thereof is larger than a predetermined reference, thereby detecting a packet.

Here, the receiver cannot receive a second preamble symbol and a third preamble symbol which are transmitted through a second frequency band (band #2) 120 and a third frequency band (band #3) 130 because frequency hopping is not performed.

As described above, the receiver reconfirms the cross correlation value 350 for performing packet detection in order to prevent error from being generated by noise and interference.

At step S320, the receiver acquires timing synchronization using a cross correlation value between a sixth preamble symbol and a ninth preamble symbol.

Then, the receiver estimate frequency offset using the $14^{th}$ preamble symbol to the $21^{st}$ preamble symbol at step S330.

At step S340, the receiver performs frame detection using the $19^{th}$ preamble symbol to the $21^{st}$ preamble symbol.

Here, frame detection is a process of detecting a starting point of a data symbol by detecting the end of a preamble symbol duration.

As described above, the receiver perform packet detection, timing synchronization, frequency offset estimation, and frame detection through calculating a cross correlation value for 21 continuous preambles among total 24 preambles based on a method for acquiring OFDM synchronization according to the related art.

Therefore, when the receiver fails to detect the first preamble symbol while performing synchronization based on the method for acquiring OFDM synchronization according to the related art, the receiver cannot perform packet detection, timing synchronization, frequency offset estimation, and frame detection.

SUMMARY

Therefore, an object of the present invention is to provide a method and apparatus for acquiring orthogonal frequency division multiplexing (OFDM) synchronization, which can reduce a time for acquiring synchronization by performing timing synchronization and reexamination of packet detection at the same time.

Another object of the present invention is to provide a method and apparatus for acquiring OFDM synchronization, which enable synchronization to be acquired by reducing the number of preamble symbols necessary for acquiring synchronization even when a receiver fails to detect a plurality of preamble symbols at an initial stage.

To achieve these and other advantages and in accordance with the purpose(s) of the present invention as embodied and broadly described herein, a method for acquiring orthogonal frequency division multiplexing (OFDM) in accordance with an aspect of the present invention includes: adjusting a frequency to a first frequency band and calculating a cross correlation value between a received preamble symbol and a preset preamble symbol; when the calculated cross correlation value is larger than a predetermined reference value and is first detected, performing frequency hopping to receive subsequent symbols and reexamining cross correlation values to the subsequent symbols; and when the reexamined cross correlation value larger than the predetermined reference value is detected, performing timing synchronization, frequency offset estimation, and frame detection.

To achieve these and other advantages and in accordance with the purpose(s) of the present invention, an apparatus of acquiring OFDM synchronization in accordance with another aspect of the present invention includes; a receiving block for adjusting a frequency to a first frequency band and receiving preamble symbols; a cross correlation calculating block for calculating a cross correlation value between the received preamble symbol and a preset preamble symbol and comparing the calculated cross correlation value with a predetermined reference value; and a synchronization acquiring block for performing packet detection when a cross correlation value larger than the predetermined reference value is first detected, and allowing the receiving block to perform frequency hopping to a different frequency band; wherein the synchronization acquiring block performs packet detection reexamination, timing synchronization, frequency offset estimation, and frame detection by comparing a cross correlation value since the first and second cross correlation values which are larger than the predetermined reference value, with the predetermined reference value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings.

Figure 4:
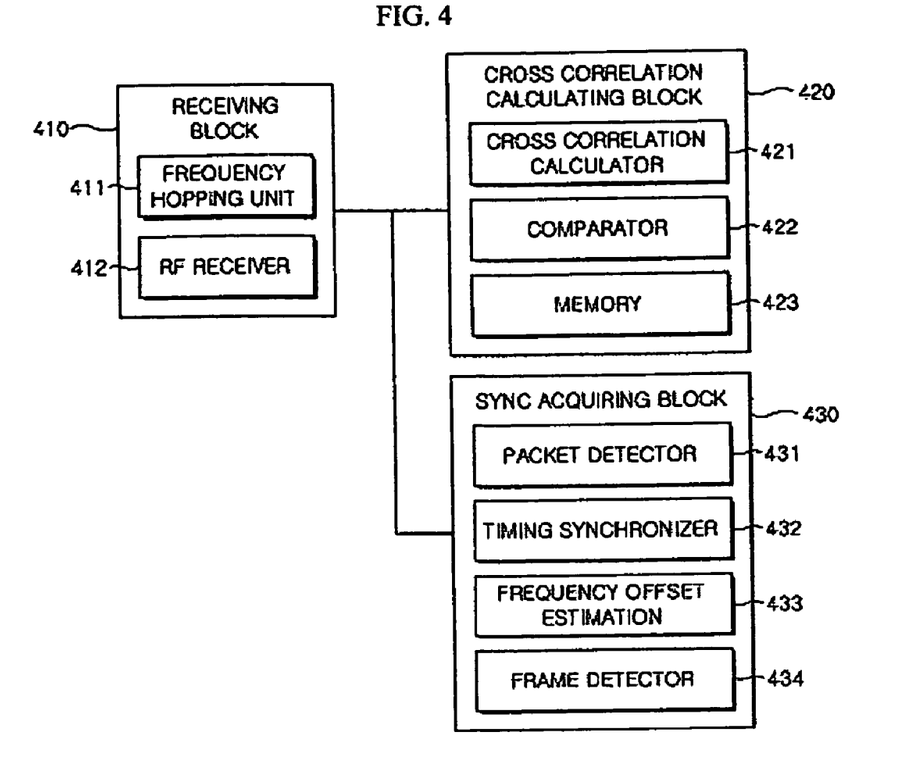
FIG. 4 is a block diagram illustrating an apparatus for acquiring OFDM synchronization according to an embodiment of the present invention.

FIG. 4 is a block diagram illustrating an apparatus for acquiring OFDM synchronization according to an embodiment of the present invention.

As shown in FIG. 4, the OFDM synchronization acquiring apparatus according to the present embodiment includes a receiving block 410 for receiving a preamble symbol by adjusting a frequency to a first frequency band, a cross correlation calculating block 420 for calculating a cross correlation value of a received preamble symbol and a preset preamble symbol and comparing the calculated cross correlation value with a predetermined reference value, and a sync acquiring block 430 for performing packet detection when a cross correlation value smaller than a predetermined reference value is detected at the first time and allowing the receiving block 410 to perform frequency hopping in an order of a third frequency band, a first frequency band, and a second frequency band.

Here, it is preferable that the OFDM synchronization acquiring apparatus commonly uses constituent elements of the receiver excepting blocks used for a specific function.

The receiving block 410 receives preambles transmitted through three different frequency bands by performing frequency hopping.

The receiving block 410 includes a frequency hopping unit 411 for performing frequency hopping and a radio frequency (RF) receiver 412 for receiving preamble symbols and data symbols.

The cross correlation calculating block 420 calculates a cross correlation value of a received preamble symbol and a preset preamble symbol and compares the calculated cross correlation value with a predetermined reference value.

The cross correlation calculating block 420 includes a cross correlation calculator 421 for calculating a cross correlation value between a received preamble symbol and a preset preamble symbol, a comparator 422 for comparing the calculated cross correlation value with a predetermined reference value, and a memory 423 for storing the calculated cross correlation value and the predetermined reference value.

The synchronization acquiring block 430 performs packet detection, timing synchronization, frequency offset estimation, and frame detection. The synchronization acquiring block 430 includes a packet detector 431, a timing synchronizer 432, a frequency offset estimator 433, and a frame detector 434.

The packet detector 431 performs packet detection for preambles, and the timing synchronizer 432 acquires timing synchronization of preambles.

The frequency offset estimator 433 estimates a frequency offset of preambles, and the frame detector 434 determines the end point of received preamble symbol duration and thereafter detects a point of transmitting a data frame.

Figure 5:
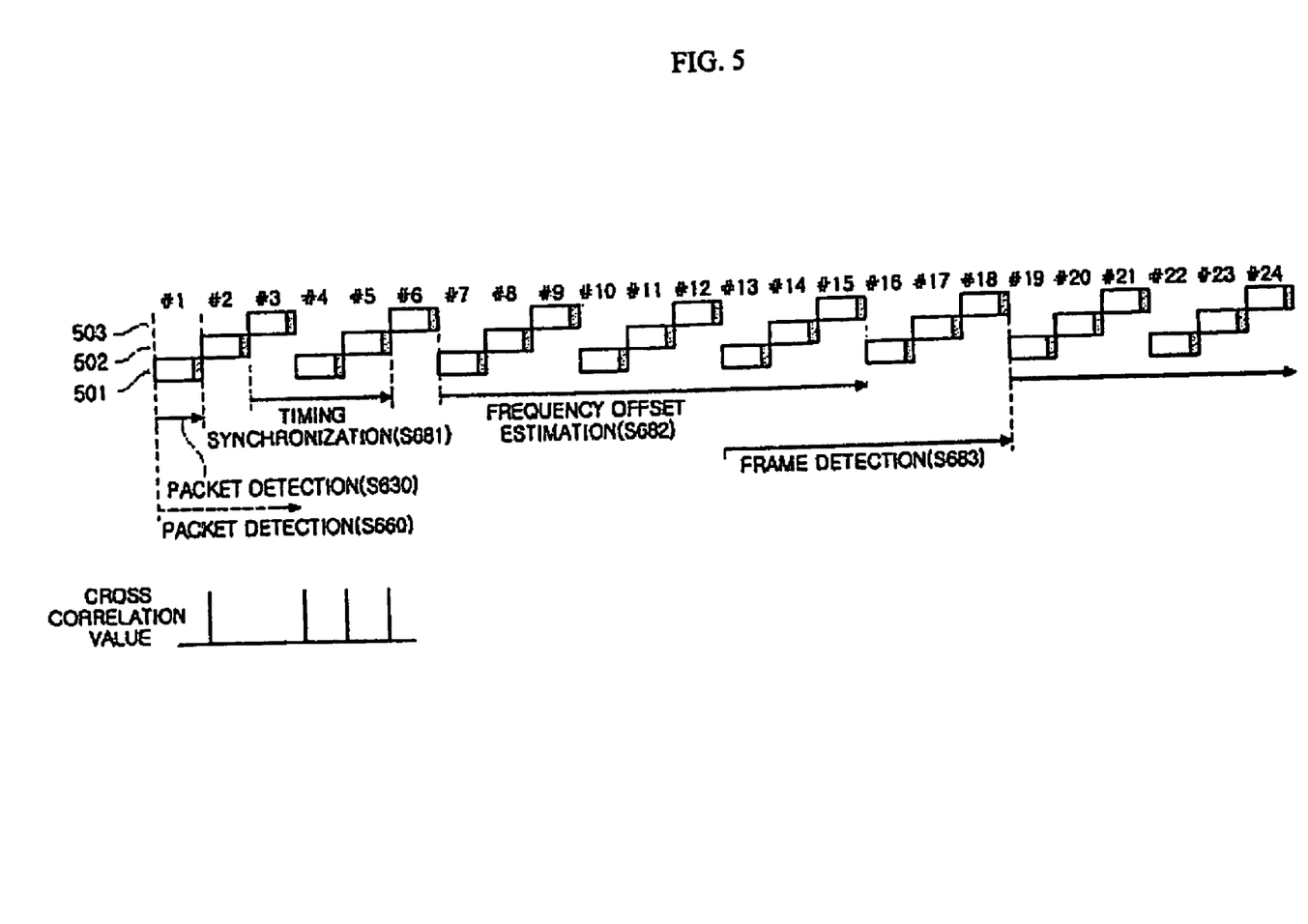
FIG. 5 is a diagram illustrating detection of OFDM symbols and cross correlation value according to an embodiment of the present invention.
Figure 6:
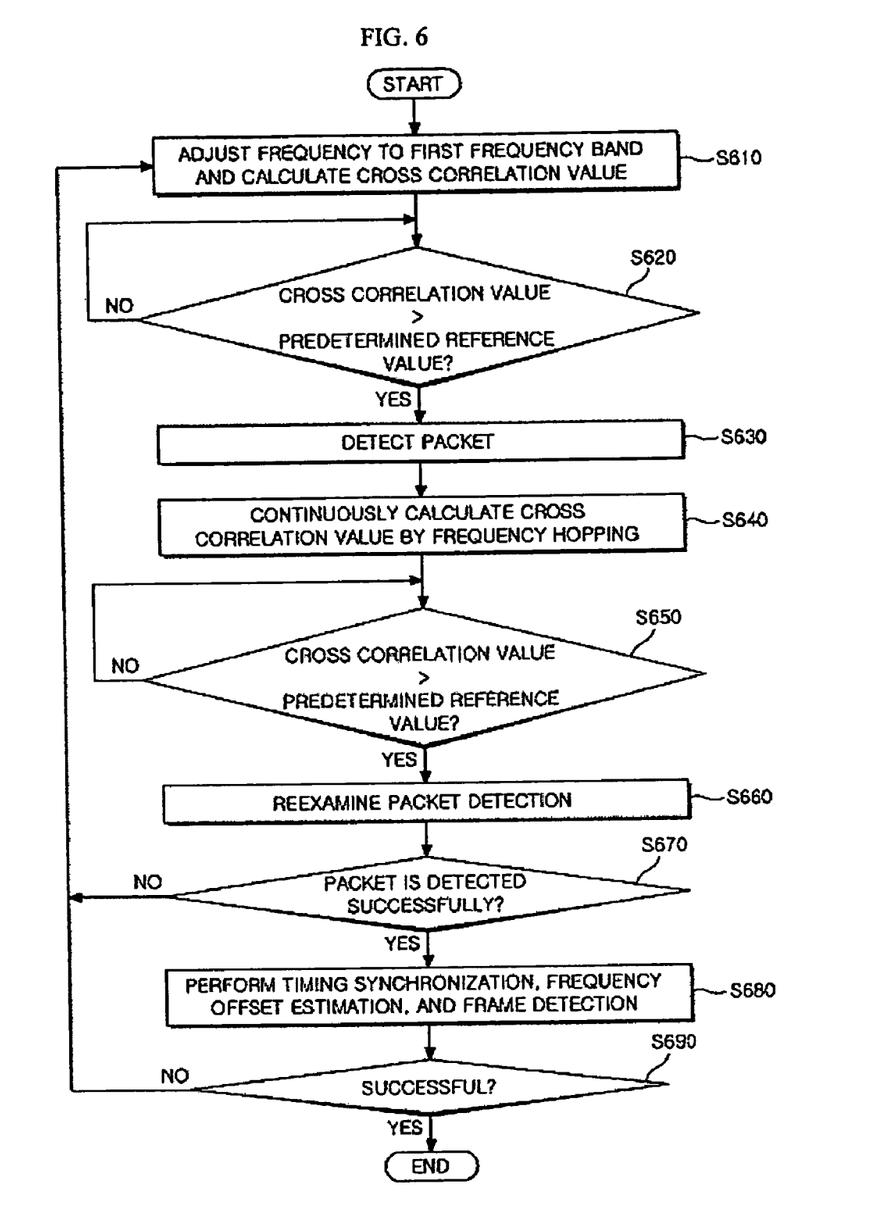
FIG. 6 is a flowchart illustrating a method for acquiring OFDM synchronization according to an embodiment of the present invention.

FIG. 5 is a diagram illustrating detection of OFDM symbols and cross correlation value according to an embodiment of the present invention, and FIG. 6 is a flowchart illustrating a method for acquiring OFDM synchronization according to an embodiment of the present invention. Hereinafter, the flowchart of FIG. 6 will be described with reference to FIG. 5.

At first, the OFDM synchronization acquiring apparatus according to the present embodiment adjusts a frequency to a first frequency band (band #1) 501 and calculates a cross correlation value of a received preamble symbol and a preset preamble at step S610.

Then, when the calculated cross correlation value is larger than a predetermined reference value at step S620, the OFDM synchronization acquiring apparatus according to the present embodiment decides to perform packet detection of preambles at step S630.

That is, the OFDM synchronization acquiring apparatus according to the present embodiment decides packet detection when the cross correlation value of the first received preamble symbol is larger than the predetermined reference value.

After deciding packet detection, the OFDM synchronization acquiring apparatus starts frequency hopping in an order from a third frequency band (band #3) 503, a first frequency band 501, and a second frequency band (band #2) 502, continuously calculates cross correlation values and compares the calculated cross correlation values with a predetermined reference value at step S640.

At this time, it is preferable that the OFDM synchronization acquiring apparatus according to the present embodiment performs frequency hopping in an order of the first frequency band 501, the third frequency band 502, and the third frequency band 503 after performing frequency hopping from the first frequency band 501 to the third frequency band 503 at first.

Then, the OFDM synchronization acquiring apparatus redetects a cross correlation value that is larger than a predetermined reference value at step S650 and reexamines packet detection at step S660.

When the OFDM synchronization acquiring apparatus successfully performs the packet detection at step S670, the OFDM synchronization acquiring apparatus continuously performs timing synchronization, frequency offset estimation, and frequency detection at step S680.

In detail, the OFDM synchronization acquiring apparatus reexamines packet detection at step S660 when a cross correlation value of a third preamble symbol is larger than a predetermined reference value.

Then, when cross correlation values of fourth and fifth receiving symbols are larger than a predetermined reference value, the OFDM synchronization acquiring apparatus acquires timing synchronization at step S681.

When cross correlation values of $7^{th}$ to $15^{th}$ preamble symbols are larger than a predetermined reference value, the OFDM synchronization acquiring apparatus performs frequency offset estimation at step S682.

When cross correlation values of $13^{th}$ to $18^{th}$ preamble symbols are larger than a predetermined reference value, the OFDM synchronization acquiring apparatus performs frame detection at step S683.

While performing the above described steps, when the OFDM synchronization acquiring apparatus fails to perform packet detection at step S670, or when the OFDM synchronization acquiring apparatus fails to acquire timing synchronization, to estimate frequency offset, and to detect frames at step S690, the OFDM synchronization acquiring apparatus performs again packet detection at step S610.

Since synchronization can be acquired using ⅚ of total preamble symbols in the OFDM synchronization acquiring method according to the present embodiment, overall synchronization can be successfully acquired although a receiver fails to receive preamble symbols at an initial stage when the receiver successfully receives preamble symbols after the receiver fails to receive less than six preamble symbols at an initial stage.

The method and apparatus for acquiring OFDM synchronization according to the present embodiment can reduce a time for acquiring synchronization by performing timing synchronization and reexamining packet detection at the same time.

Furthermore, the method and apparatus for acquiring OFDM synchronization according to the present embodiment need less preamble symbols to acquire the synchronization. Therefore, synchronization can be acquired although preamble detection fails at below a predetermined level.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for acquiring orthogonal frequency division multiplexing (OFDM) synchronization, comprising:

adjusting a frequency to a first frequency band and calculating a cross correlation value between a received preamble symbol and a preset preamble symbol by a cross correlation calculator;

when the calculated cross correlation value is larger than a predetermined reference value and is first detected, performing frequency hopping to receive subsequent symbols and reexamining cross correlation values to the subsequent symbols; and when the reexamined cross correlation value larger than the predetermined reference value is detected, performing timing synchronization, frequency offset estimation, and frame detection.

2. The method of claim 1, further comprising returning to the calculating of a cross correlation value when the recalculated cross correlation value larger than the predetermined reference value is not detected in the reexamining of cross correlation values.

3. The method of claim 1, wherein the reexamining of cross correlation values comprises performing frequency hopping from the first frequency band to a third frequency band.

4. The method of claim 1, wherein the performing of timing synchronization, frequency offset estimation, and frame detection comprises:

acquiring the timing synchronization when the cross correlation values larger than the predetermined reference value are detected more than predetermined times;

performing the frequency offset estimation when the cross correlation values larger than the predetermined reference value are continuously detected predetermined times after the synchronization is acquired; and performing the frame detection when the cross correlation values larger than the predetermined reference value are continuously detected predetermined times after performing the frequency offset estimation.

5. The method of claim 4, further comprising returning to the calculating of a cross correlation value when the timing synchronization, the frequency offset estimation, and the frame detection fail.

6. The method of claim 1, wherein the timing synchronization is performed by referring to the cross correlation value larger than the predetermined reference value, which is second detected.

7. An apparatus of acquiring orthogonal frequency division multiplexing (OFDM) synchronization, comprising:

a receiving block to adjust a frequency to a first frequency band and receiving preamble symbols;

a cross correlation calculating block to calculate a cross correlation value between the received preamble symbol and a preset preamble symbol and comparing the calculated cross correlation value with a predetermined reference value; and a synchronization acquiring block to perform packet detection when a cross correlation value larger than the predetermined reference value is first detected, and to allow the receiving block to perform frequency hopping to a different frequency band, wherein the synchronization acquiring block performs packet detection reexamination, timing synchronization, frequency offset estimation, and frame detection by comparing a cross correlation value since the first and second cross correlation values which are larger than the predetermined reference value, with the predetermined reference value.

8. The apparatus of claim 7, wherein the receiving block comprises:
 a frequency hopping unit to perform frequency hopping for at least three different frequency bands; and
 a radio frequency (RF) receiver to receive the preamble symbols.

9. The apparatus of claim 7, wherein the cross correlation calculating block comprises:
 a cross correlation calculator to calculate a cross correlation value between the received preamble symbol and the preset preamble symbol; and
 a comparator to compare the calculated cross correlation value with the predetermined reference value to determine whether the calculated cross correlation value is larger than the predetermined reference value or not.

10. The apparatus of claim 7, wherein the cross correlation calculating block comprises a memory to store the preset preamble symbol and the calculated cross correlation value.

11. The apparatus of claim 7, wherein the sync acquiring block comprises:
 a packet detector to perform packet detection of the received preamble symbol;
 a timing synchronizer to perform timing synchronization of the received preamble symbol;
 a frequency offset estimator to estimate frequency offset of the received preamble symbol; and
 a frame detector to detect an end of a duration of the received preamble symbol.

\* \* \* \* \*